United States Patent [19]

Shimazu

[11] 4,451,984

[45] Jun. 5, 1984

[54] INNER BLADE FOR USE IN RECIPROCATING TYPE ELECTRIC SHAVER

[75] Inventor: Hiroshi Shimazu, Fukuoka, Japan

[73] Assignee: Kyushu Hitachi Maxell, Ltd., Fukuoka, Japan

[21] Appl. No.: 417,841

[22] Filed: Sep. 14, 1982

[30] Foreign Application Priority Data

Jan. 29, 1982 [JP] Japan .................................. 57-14023

[51] Int. Cl.³ ........................ B26B 19/00; B26B 19/02; B23B 17/00

[52] U.S. Cl. ................................ 30/346.52; 30/43.92; 29/412

[58] Field of Search .................... 30/43.92, 44, 346.51, 30/346.52; 29/3, 412; 72/379, 414, 321

[56] References Cited

U.S. PATENT DOCUMENTS

| | | | |
|---|---|---|---|
| 1,941,892 | 1/1934 | Greve | 72/379 |
| 2,400,027 | 4/1946 | Scully | 30/43.92 |
| 2,512,688 | 6/1950 | Skog | 29/412 |
| 3,160,131 | 12/1964 | George et al. | 29/512 |
| 3,178,818 | 4/1965 | Liska | 30/43.92 |
| 3,332,146 | 7/1967 | Kratz | 30/43.92 |
| 3,387,481 | 6/1968 | Harvey et al. | 72/321 |
| 3,887,988 | 6/1975 | Mortlock | 29/412 |
| 4,261,101 | 4/1981 | Tietjens | 30/346.51 |

*Primary Examiner*—E. R. Kazenske
*Assistant Examiner*—Paul M. Heyrana, Sr.
*Attorney, Agent, or Firm*—Birch, Stewart, Kolasch & Birch

[57] ABSTRACT

An inner blade (15) for use in a reciprocating type electric shaver, including at least two support members (17) and a plurality of inner blade elements (16) mounted on the at least two support members (17). The inner blade element (16) having a pair of a first blade tip portion (19) and a second blade tip portion (19') is formed by folding, a blank (24) having a profile symmetrical with respect to a line (L), along the line (L) into a pair of a first inner blade element portion (18) and a second inner blade element portion (18') such that the first inner blade element portion (18) is brought into close contact with the second inner blade element portion (18').

9 Claims, 19 Drawing Figures

INNER BLADE FOR USE IN RECIPROCATING TYPE ELECTRIC SHAVER

BACKGROUND OF THE INVENTION

The present invention generally relates to an electric shaver and more particularly, to an inner blade for use in a reciprocating type electric shaver.

Conventionally, in reciprocating type electric shavers, it has been so arranged, for example, as shown in FIG. 1 that the inner blade comprises coupling pipes 13 and a plurality of inner blade elements 2 which are fixedly mounted, in parallel with each other, on the coupling pipes 13 after insertion of the coupling pipes 13 through corresponding coupling holes of each of the inner blade elements 2 so as to be brought into sliding contact with an inner surface of a fixed outer blade 1. The inner blade elements 2 are manufactured by subjecting a metallic sheet to press working. Furthermore, a groove portion 3 is formed on each of opposite faces of the inner blade element 2 by press working such that a rake angle $\theta$ for improving cutting efficiency of hairs is provided at each of opposite blade tip portions 4. It is desirable to increase the rake angle $\theta$ as much as possible in order to increase the cutting efficiency of hairs. However, in order to increase the rake angle $\theta$, thickness of the inner blade element 2 is required to be increased such that the inner blade element 2 can withstand pressure of press working for forming the groove portions 3. However, when the thickness of the inner blade element 2 is increased, total weight of the inner blade becomes large, thereby resulting in increase of power consumption of a drive source of the shaver. Thus, the rake angle $\theta$ formed on the inner blade element 2 made of a metallic sheet is restricted to a certain value.

Then, in order to solve the above described problem regarding the rake angle $\theta$, an inner blade element 5 comprising a pair of bent pieces 6 and 7 formed with blade tip portions 8 and 8′, respectively has been developed as shown in FIG. 2. The pair of the bent pieces 6 and 7 are, respectively, provided with coupling holes 11 and 12 each receiving the coupling pipe 13 therein and are brought into contact with each other such that the blade tip portions 8 and 8′ are directed in opposite directions remote from each other. In the case of the inner blade element 5, a large rake angle $\theta$ can be obtained easily by bending each of the blade tip portions 8 and 8′ and further, total weight of the inner blade can be reduced due to small sheet thickness of the bent pieces 6 and 7. However, in order to assemble the inner blade elements 5 having such constructions into an inner blade, it has been so arranged as shown in FIG. 3 that the inner blade elements 5 each comprising the pair of the bent pieces 6 and 7 in close contact with each other, are fitted into corresponding slots 10 provided side by side, on an assembly stand 9, with the blade tip portions 8 and 8′ being directed in opposite directions remote from each other. However, it is quite troublesome and extremely low in working efficiency to fit the pair of the bent pieces 6 and 7 into each of the slots 10 such that the pair of the bent pieces 6 and 7 are brought into close contact with each other, with the blade tip portions 8 and 8′ being directed in opposite directions remote from each other. Furthermore, burr may be formed around peripheral edges of the coupling holes 11 and 12 of the respective bent pieces 6 and 7. In that case, as indicated by the arrow A in FIG. 3, it becomes impossible to align the coupling hole 11 with the coupling hole 12 accurately after the bent pieces 6 and 7 have been fitted into each of the slots 10, so that it becomes difficult to insert the coupling pipes 13 through the coupling holes 11 and 12. Moreover, since the bent pieces 6 and 7 are mounted on the coupling pipes 13 independently of each other through insertion of the coupling pipes 13 thereinto, such an inconvenience may arise that either one of the bent pieces 6 and 7 is moved in an axial direction of the coupling pipes 13 so as to be separated from the other one of the bent pieces 6 and 7 under improper conditions of punching of the coupling holes 11 and 12 and of an operation of inserting the coupling pipes 13 through the coupling holes 11 and 12. Furthermore, the inner blade elements 5 each comprising the pair of the bent pieces 6 and 7 have such a disadvantage that the bent pieces 6 and 7 tend to be caused to adhere to each other during heat treatment of the bent pieces 6 and 7 as shown in FIG. 4.

SUMMARY OF THE INVENTION

Accordingly, an essential object of the present invention is to provide an improved inner blade for use in a reciprocating type electric shaver, including a plurality of inner blade elements each having a pair of a first inner blade element portion and a second inner blade element portion, which prevents either one of the pair of the first and second inner blade element portions from being separated from the other one of the pair of the first and second inner blade element portions and is simple in assembly operation, with substantial elimination of the disadvantages inherent in conventional inner blades of this kind.

Another important object of the present invention is to provide an improved inner blade of the above described type which is reduced in total weight, highly reliable in actual use, suitable for mass production at low cost and can be readily incorporated into reciprocating type electric shavers and the like at low cost.

In accomplishing these and other objects, according to one preferred embodiment of the present invention, there is provided an improved inner blade for use in a reciprocating type electric shaver, including at least two support members and a plurality of inner blade elements mounted, in parallel with each other and at a predetermined interval therebetween in reciprocating directions of said inner blade, on said at least two support members, the improvement comprising:

said inner blade element having a pair of a first blade tip portion and a second blade tip portion, which is formed by folding, a sheet having a profile symmetrical with respect to a line, along said line into a pair of a first inner blade element portion and a second inner blade element portion so as to have a U-shaped cross section along said line at one end of said inner blade element such that said first inner blade element portion is brought into close contact with said second inner blade element portion;

said pair of said first blade tip portion and said second blade tip portion which are, respectively, provided at one end of said first inner blade element portion remote from said one end of said inner blade element and at one end of said second inner blade element portion remote from said one end of said inner blade element and are, respectively, formed by bending said one end of said first blade element portion and said one end of said second inner blade element portion outwardly in opposite directions remote from each other so as to constitute a rake angle at each of said first blade tip portion and said second blade tip portion such that said inner blade element has a Y-shaped cross section at the other end thereof with said pair of said first blade tip portion and said second blade tip portion being brought into sliding contact with an inner surface of a fixed outer blade of said reciprocating type electric shaver; and said pair of said first inner blade element portion and said second inner blade element portion which have, respectively, at least two first coupling holes and at least two second coupling holes provided at positions corresponding to those of the respective at least two first coupling holes so as to form at least two coupling holes on said inner blade element such that said at least two support members are inserted through the at least two coupling holes of each of the plurality of said inner blade elements, respectively.

In accordance with the present invention, either one of the pair of the first and second inner blade element portions is desirably prevented from being separated from the other one of the pair of the first and second inner blade element portions, the assembly operation of the inner blade has been made remarkably simple and the total weight of the inner blade has been reduced.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts ae designated by like reference numerals throughout several views of the accompanying drawings.

DETAILED DESCRIPTION OF THE INVENTION

Figure 5:
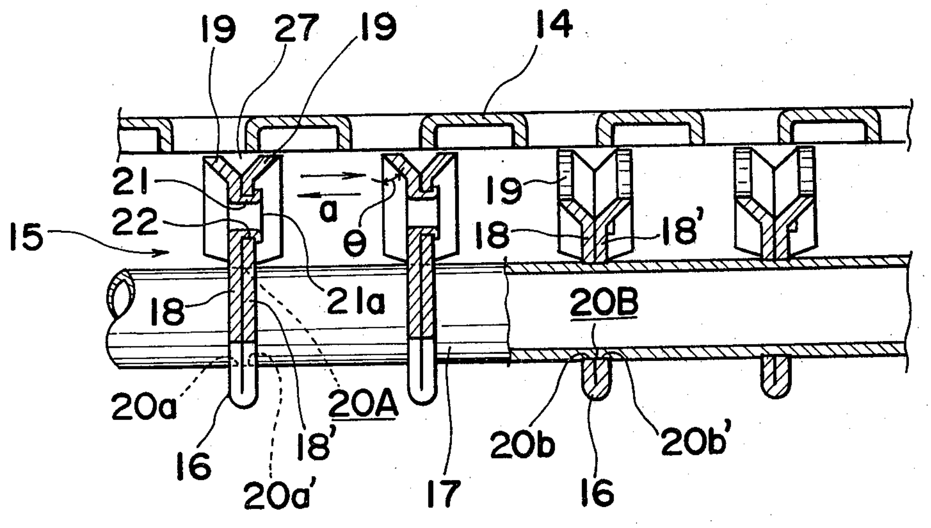
FIG. 5 is a cross-sectional view of an inner blade including a plurality of inner blade elements, according to one preferred embodiment of the present invention.
Figure 6:
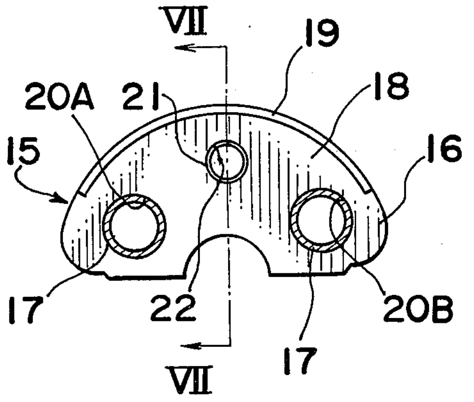
FIG. 6 is a side elevational view of the inner blade of FIG. 5.
Figure 7:
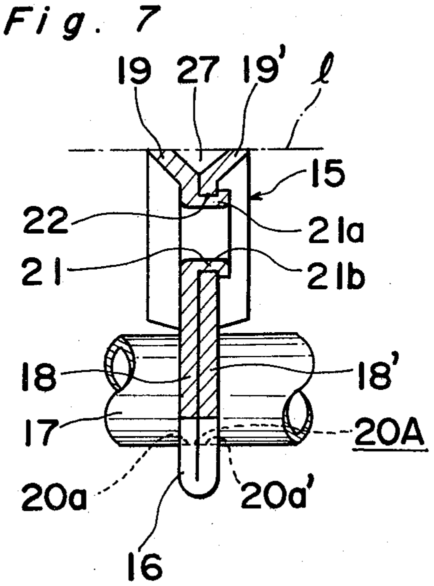
FIG. 7 is a cross-sectional view taken along the line VII—VII in FIG. 6.

Referring now to the drawings, there is shown in FIGS. 5 to 7, an inner blade 15 according to one preferred embodiment of the present invention, which is brought into sliding contact with an inner surface of a fixed outer blade 14 of a meshy configuration in a reciprocating type electric shaver. The inner blade 15 comprises two coupling members 17 each made of a pipe and a plurality of inner blade elements 16 mounted, in parallel with each other and at a predetermined interval therebetween, in reciprocating directions of the inner blade 15, on the coupling members 17. The inner blade 15 is reciprocated in directions indicated by the arrow a in FIG. 5 by a drive mechanism (not shown) of the electric shaver. Each of the inner blade elements 16 includes a pair of a first inner blade element portion 18 and a second inner blade element portion 18' which constitute a U-shaped cross section at one end of the inner blade element 16. More specifically, the pair of the first inner blade element portion 18 and the second inner blade element portion 18' are brought into close contact with each other by folding a blank 24 of substantially circular shape to be described later such that the inner blade element 16 has the U-shaped cross section at the one end thereof. The inner blade element 16 further includes a pair of a first blade tip portion 19 and a second blade tip portion 19' which constitute a Y-shaped cross section at the other end of the inner blade element 16. More specifically, the pair of the first blade tip portion 19 and the second blade tip portion 19' are, respectively, provided at one end of the first inner blade element portion 18 remote from the U-shaped end of the inner blade element 16 and at one end of the second inner blade element portion 18' remote from the U-shaped end of the inner blade element 16.

The first blade tip portion 19 and second blade tip portion 19' are, respectively, formed by bending the one end of the first inner blade element portion 18 and the one end of the second inner blade element portion 18' outwardly in opposite directions remote from each other so as to constitute a rake angle $\theta$ at each of the first blade tip portion 19 and the second blade tip portion 19' such that the inner blade element 16 has the Y-shaped cross section at the other end thereof with the pair of the first blade tip portion 19 and the second blade tip portion 19' being brought into sliding contact with an inner surface of the fixed outer blade 14.

The pair of the first inner blade element portion 18 and the second inner blade element portion 18' are, respectively, provided with two first coupling holes 20*a* and 20*b*, and two second coupling holes 20*a*' and 20*b*' extending in alignment with the first coupling holes 20*a* and 20*b*, respectively, whereby two coupling holes 20A and 20B are, respectively, formed on the inner blade element 16 by the first coupling hole 20*a* and the second coupling hole 20*a*' and by the first coupling hole 20*b* and the second coupling hole 20*b*'.

Furthermore, a cylindrical projection 21 having an opening **21*b* extending at a central portion thereof is provided adjacent to the Y-shaped end of the inner blade element 16 and at a central portion between the coupling holes 20A and 20B on either one of the first inner blade element portion 18 and second inner blade element portion 18′ and is fitted into a caulking hole 22 formed at a position corresponding to that of the cylindrical projection 21 and on the other one of the first inner blade element portion 18 and second inner blade element portion 18′ so as to project out of the caulking hole 22. A projecting end 21*a* of the cylindrical projection 21, projecting out of the caulking hole 22, is caulked so as to extend outwardly in a radial direction thereof along one face of the other one of the first inner blade element portion 18 and second inner blade element portion 18′, remote from the either one of the first inner blade element portion 18 and second inner blade element portion 18′**.

Figure 8:
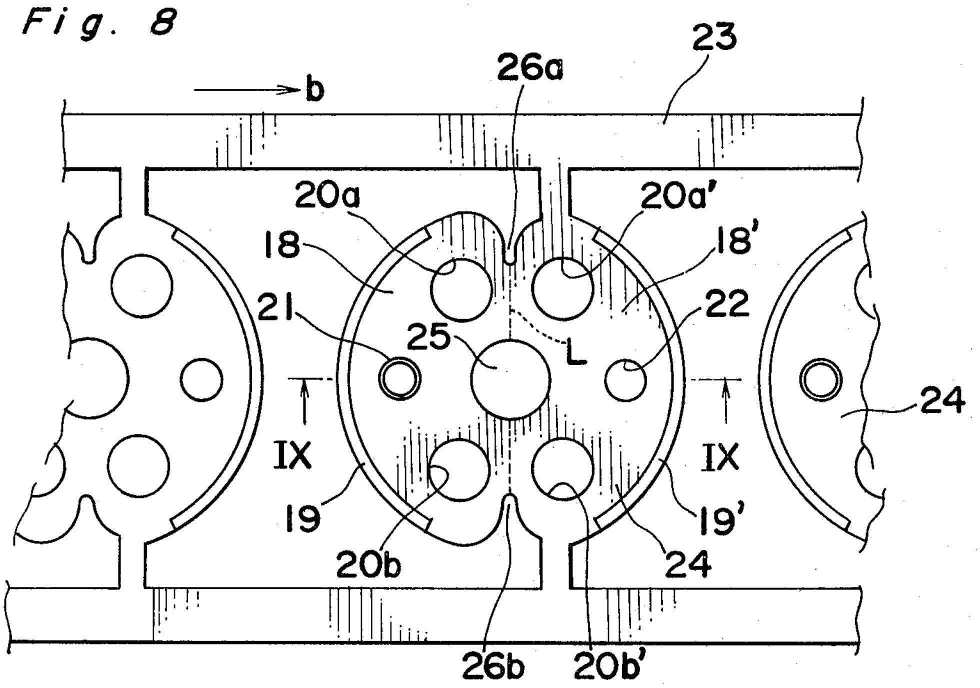
FIG. 8 is a view explanatory of blank layout of the inner blade elements of FIG. 5.
Figure 9:
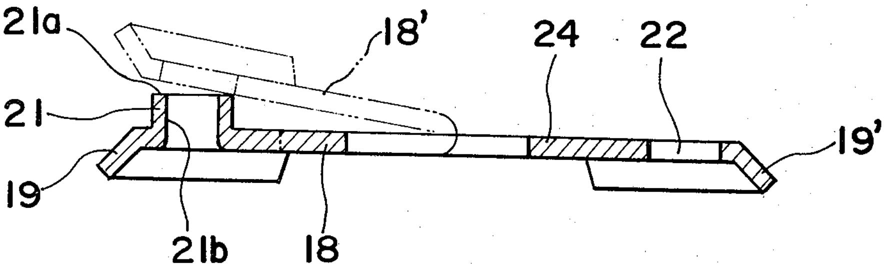
FIG. 9 is an enlarged cross-sectional view taken along the line IX—IX in FIG. 8.

Hereinbelow, one example of manufacture of the inner blade element 16 having such constructions will be described. As shown in FIG. 8, a hoop 23 made of stainless steel, etc., which has been subjected to rolling in a longitudinal direction thereof indicated by the arrow b is fed sequentially along a press line in the rolling direction indicated by the arrow b so as to be subjected to blanking such that each of the blanks 24 each having substantially circular shape is connected with the loop 23 only at opposite ends of the blank 24, with a line connected between the opposite ends of the blank 24 extending at right angles to the rolling direction indicated by the arrow b. The blank 24 is symmetrical with respect to a folding line L extending at right angles to the rolling direction indicated by the arrow b in FIG. 8 so as to be divided, by the folding line L, into the first inner blade element portion 18 and the second inner blade element portion 18′ each having substantially semicircular shape. The blank 24 has a pair of V-shaped recesses **26*a* and 26*b* provided at opposite ends of the folding line L. Thereafter, peripheral edges of the first inner blade element portion 18 and the second inner blade element portion 18′ are, respectively, bent downwardly with respect to one face of the blank 24 as shown in FIG. 9, whereby the first blade tip portion 19 and second blade tip portion 19′ each having the rake angle $\theta$ are, respectively, formed on the peripheral edges of the first inner blade element portion 18 and the second inner blade element portion 18′** symmetrically with respect to the folding line L.

Figure 10:
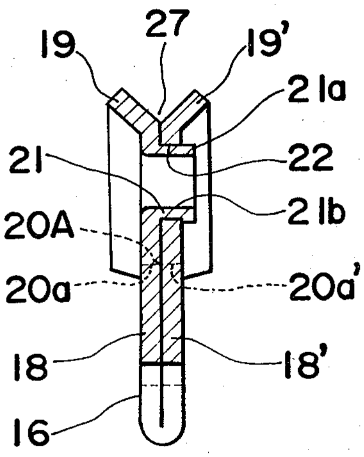
FIG. 10 is a cross-sectional view of the inner blade element of FIG. 5 prior to caulking and grinding.

Meawhile, the first inner blade element portion 18 is punched to have the two first coupling holes **20*a* and 20*b* while the second inner blade element portion 18′ is punched to have the two second coupling holes 20*a′* and 20*b′* provided at positions corresponding to the first coupling holes 20*a* and 20*b*, respectively. The blank 24 is further punched to have a folding opening 25 provided at a central portion thereof. Furthermore, the cylindrical projection 21 having the opening 21*b* extending at the central portion thereof is formed adjacent to the first blade tip portion 19 and at a central portion between the first coupling holes 20*a* and 20*b* by burring with the cylindrical projection 21 projecting upwardly in the direction opposite to the direction of bending of the first blade tip portion 19 as shown in FIG. 9. On the other hand, the second inner blade element portion 18′ is punched to have the caulking hole 22 formed at the position corresponding to that of the cylindrical projection 21 with a diameter of the caulking hole 22 being slightly larger than an outside diameter of the cylindrical projection 21. Then, the blank 24 is folded along the folding line L into the pair of the first inner blade element portion 18 and the second inner blade portion 18′, so that the first inner blade element portion 18 and the second inner blade element portion 18′ are brought into close contact with each other and thus, the U-shaped cross section is formed along the folding line L at one end of the blank 24 such that the cylindrical projection 21 is fitted into the caulking hole 22 as shown in FIG. 10 with the first coupling holes 20*a* and 20*b* being brought into alignment with the second coupling holes 20*a′* and 20*b′*, respectively, whereby there is provided the inner blade element 16 having a U-shaped cross section constituted at one end thereof by the first inner blade element portion 18 and the second inner blade element portion 18′, a Y-shaped cross section constituted at the other end thereof by the first blade tip portion 19 and the second blade tip portion 19′, the coupling hole 20A formed by the first coupling hole 20*a* and the second coupling hole 20*a′*, and the coupling hole 20B formed by the first coupling hole 20*b* and the second coupling hole 20*b′*. It is to be noted here that folding of the blank 24 can be performed easily with a small force through the pair of the V-shaped recesses 26*a* and 26*b* and the folding opening 25. It should be further noted that since the folding line L extends at right angles to the rolling direction of the hoop 23 indicated by the arrow b in FIG. 8, folding of the blank 24 does not result in cutting of portions of the blank 24** adjacent to the folding line L.

Simultaneously with or after the folding of the blank 24, the projecting end **21*a* of the cylindrical projection 21, projecting out of the caulking hole 22, is caulked so as to extend outwardly in a radial direction thereof along one face of the second inner blade element portion 18′ remote from the first inner blade element portion 18 as shown in FIG. 7. The caulking of the projecting end 21*a* prevents the pair of the first inner blade element portion 18 and the second inner blade element portion 18′ from being separated from each other due to a springback phenomenon after the folding and ensures that the pair of the first inner blade element portion 18 and the second inner blade element portion 18′ are securely held in close contact with each other. Finally, the inner blade element 16 is separated from the hoop 23 by cutting off opposite ends of the inner blade element 16 from the hoop 23, which opposite ends have been connected with the hoop 23**.

Figure 11:
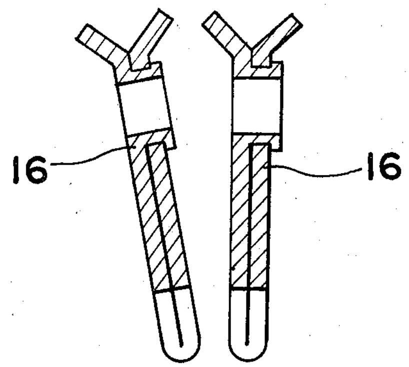
FIG. 11 is a view explanaroty of, during heat treatment, separation of the inner blade elements of FIG. 5.

Thereafter, a number of the inner blade elements 16 thus subjected to press working are heat treated simultaneously. Since each of the inner blade elements 16 has the Y-shaped cross section at the other end thereof, the inner blade elements 16 are least likely to be caused to adhere to each other even if they are gathered together as shown in FIG. 11, so that it becomes possible to heat treat each of the inner blade elements 16 uniformly.

Figure 3:
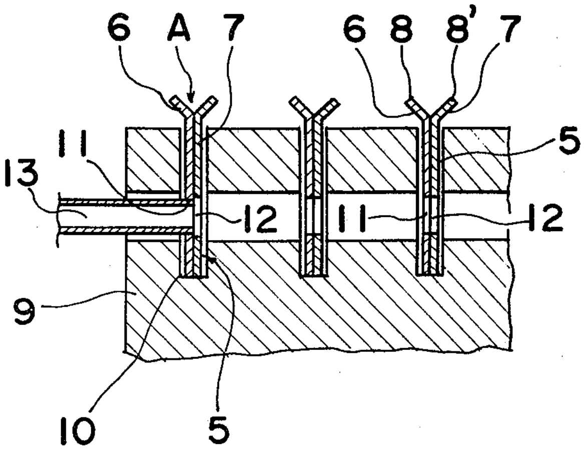
Fig. 3 PRIOR ART
FIG. 3 is a cross-sectional view explanatory of assembly of the inner blade of FIG. 2.
Figure 4:
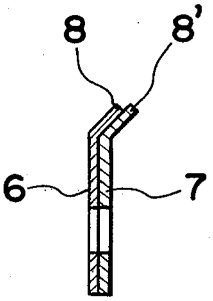
Fig. 4 PRIOR ART
FIG. 4 is a view explanatory of, during heat treatment, piling of a pair of bent pieces employed in the inner blade of FIG. 2.

Then, the inner blade elements 16 thus heat treated are assembled in a manner similar to the conventional one shown in FIG. 3. Namely, each of the inner blade elements 16 is fitted into each of the slots 10 provided side by side on the assembly stand 9 as shown in FIG. 3 such that a number of the inner blade elements 16 are arranged in parallel with each other. Thereafter, the coupling members 17 made of a pipe and having an outside diameter slightly smaller than a diameter of the coupling holes 20A and 20B are inserted through the coupling holes 20A and 20B, respectively. The coupling member 17 is made of metallic materials softer than those of the inner blade element 16, for example, aluminum, brass, stainless steel. It should be noted here that although it has been described that the hoop 23 for the inner blade elements 16 is made of such rolling materials as stainless steel, etc. in this embodiment, the rolling materials can be replaced by amorphous metals.

Then, an ironing bar (not shown) is thrusted into an inner hollow of each of the coupling members 17 in an axial direction thereof so as to expand each of the coupling members 17 in a radial direction thereof such that the coupling members 17 are caused to cling to the respective inner blade elements 16, so that the inner blade elements 16 are fixedly secured to the coupling members 17, whereby assembly of the inner blade 15 has been completed.

Figure 1:
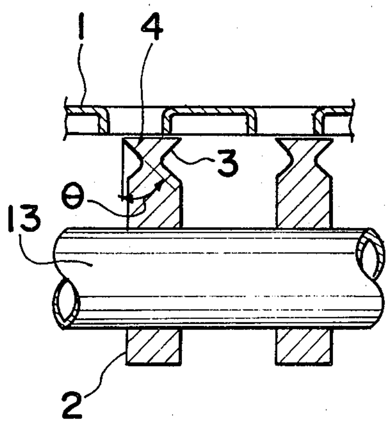
Fig. 1 PRIOR ART
FIG. 1 is a cross-sectional view of one conventional inner blade.
Figure 2:
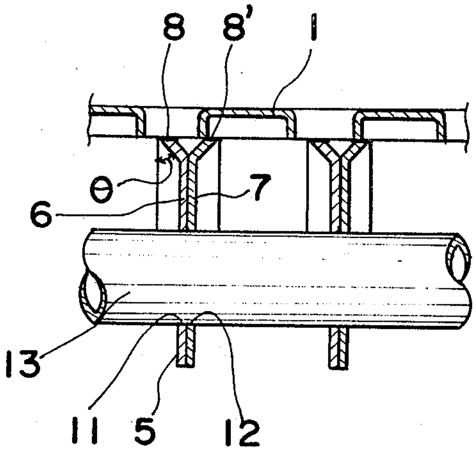
Fig. 2 PRIOR ART
FIG. 2 is a cross-sectional view of another conventional inner blade.

Since the first inner blade element portion 18 is integrally formed with the second inner blade element portion 18' in the inner blade element 16 and further, is securely held in close contact with the second inner blade element portion 18' through fitting of the cylindrical projection 21 into the caulking hole 22 and through caulking of the projecting end **21*a* of the cylindrical projection 21 on the second inner blade element portion 18' by the above described assembly of the inner blade 15, the inner blade elements 16 can be fitted into the respective slots 10 of the assembly stand 9 far more easily and quickly than the inner blade elements 5 each comprising the pair of the bent pieces 6 and 7 which are formed separately from each other as shown in FIG. 2. Furthermore, since the first coupling holes 20*a* and 20*b* of the first inner blade element portion 18 are securely held in alignment with the second coupling holes 20*a*' and 20*b*' of the second inner blade element portion 18' such that the coupling holes 20A and 20B are, respectively, formed on the inner blade element 16 by the first coupling hole 20*a* and the second coupling hole 20*a*' and by the first coupling hole 20*b* and the second coupling hole 20*b*' as described earlier, the coupling members 17 can be inserted through the respective coupling holes 20A and 20B** with great ease.

Finally, the first blade tip portion 19 and the second blade tip portion 19' of each of the inner blade elements 16 of the inner blade 15 thus assembled are subjected to centerless grinding in the assembled state of the inner blade 15 by a centerless grinding machine along the line l in FIG. 7. Since each of the inner blade elements 16 is folded into the first inner blade element portion 18 and the second inner blade element portion 18' accurately as described above, the centerless grinding can be performed at high precision so as to restrict out of roundness of the first blade tip portion 19 and second blade tip portion 19' to a minimum.

Figure 12:
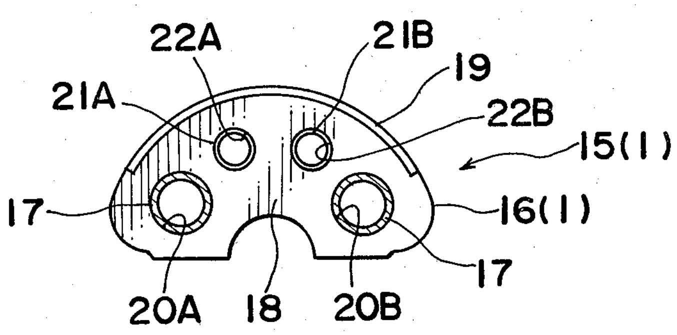
FIG. 12 is a view similar to FIG. 6, particularly showing a first modification thereof.

Although one cylindrical projection 21 and one corresponding caulking hole 22 are, respectively, formed between the coupling holes 20A and 20B on the inner blade element 16 in this embodiment, the arrangement may be so modified that two cylindrical projections 21A and 21B or more and two corresponding caulking holes 22A and 22B or more are provided between the coupling holes 20A and 20B on an inner blade element 16(1) of an inner blade 15(1) of a first modification of the inner blade 15 as shown in FIG. 12, whereby a first inner blade element portion and a second inner blade element portion of the inner blade element 16(1) are brought into close contact with each other more uniformly than those of the inner blade element 16 and the inner blade element 16(1) can be reduced, in weight, more than the inner blade element 16.

Figure 13:
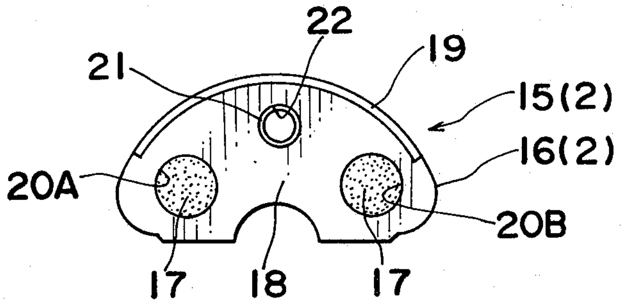
FIG. 13 is a view similar to FIG. 6, particularly showing a second modification thereof.

Meanwhile, the coupling members 17 each made of a pipe may be made of synthetic resin by filling the synthetic resin into the coupling holes 20A and 20B of an inner blade element 16(2) of an inner blade 15(2) of a second modification of the inner blade 15 such that the synthetic resin is cured integrally with the coupling holes 20A and 20B as shown in FIG. 13.

Figure 14:
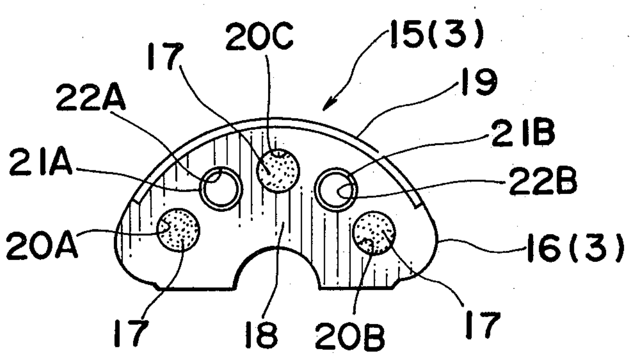
FIG. 14 is a view similar to FIG. 6, particularly showing a third modification thereof.

Furthermore, referring now to FIG. 14, there is shown an inner blade element 16(3) of an inner blade 15(3) of a third modification of the inner blade 15. In this modification, the inner blade element 16(3) includes three coupling holes 20A, 20B and 20C and two cylindrical projections 21A and 21B fitted into respective two coupling holes 22A and 22B. The caulking holes 22A and 22B are provided between the coupling holes 20A and 20B and the coupling hole 20C is disposed between the caulking holes 22A and 22B and at a central portion of the inner blade element 16(3) such that synthetic resin is filled into the coupling holes 20A, 20B and 20C.

Figure 15:
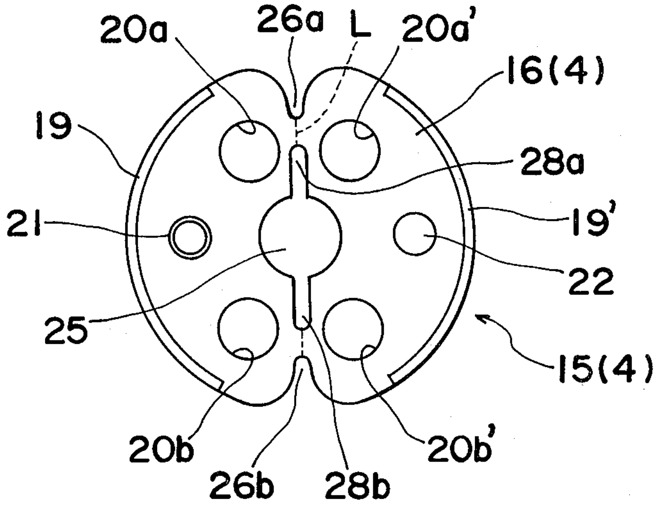
FIG. 15 is a view similar to FIG. 8, particularly showing a fourth modification thereof.

On the other hand, although folding of the blank 24 for the inner blade element 16 can be performed easily with a small force and accurately through the pair of the V-shaped recesses **26*a* and 26*b* and the folding opening 25 as described above, it can be so arranged that a pair of slits 28*a* and 28*b* extending, respectively, from the folding opening 25 outwardly in opposite directions remote from each other along the folding line L are, further, provided on an inner blade element 16(4) of an inner blade 15(4) of a fourth modification of the inner blade 15 as shown in FIG. 15 in order to facilitate folding of a blank for the inner blade element 16(4)**.

Figure 16:
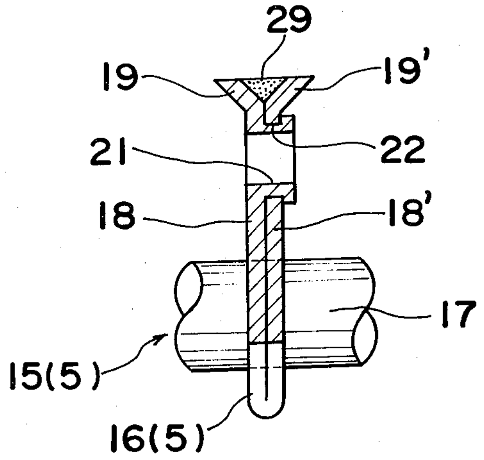
FIG. 16 is a view similar to FIG. 7, particularly showing a fifth modification thereof.

Meanwhile, the inner blade elements 16 and 16(1) to 16(4) have such a disadvantage that hair fragments, sebaceous matters etc. giving off an offensive smell are accumulated in a V-shaped space 27 (FIG. 5) enclosed by the first blade tip portion 19 and the second blade tip portion 19' during use of the electric shaver and thus, are problematical from a sanitary point of view. In order to solve the above described unsanitary problem, filler 29 made of quick-drying epoxy resin, etc. is filled in the V-shaped space 27 of an inner blade element 16(5) of an inner blade 15(5) of a fifth modification of the inner blade 15 as shown in FIG. 16 so as to prevent hair fragments, etc. from being accumulated in the V-shaped space 27. In the case where the filler 29 is made of such resins having excellent adhesive properties as epoxy resin, etc., adhesive force of the filler 29 contributes towards bringing the first inner blade element portion 18 and the second inner blade element portion 18' into close contact with each other more securely. Furthermore, in the case where the filler 29 is made of such oleo-resins as polypropylene resin containing molbdenum disulfide, etc., frictional heat produced between the fixed outer blade 14 and the pair of the first blade tip portion 19 and the second blade tip portion 19' during use of the electric shaver is transferred to the filler 29 such that oily matters are caused to ooze out of the filler 29, so that a lubricating effect is brought about at the first blade tip portion 19 and the second blade tip portion 19' so as to improve the cutting efficiency in addition to the effect of preventing hair fragments, etc. from being accumulated in the V-shaped space 27. Moreover, in the case where the filler 29 is made of aromatic resins, the filler 29 emits a nice smell and thus, the electric shaver can be used pleasantly.

Figure 17:
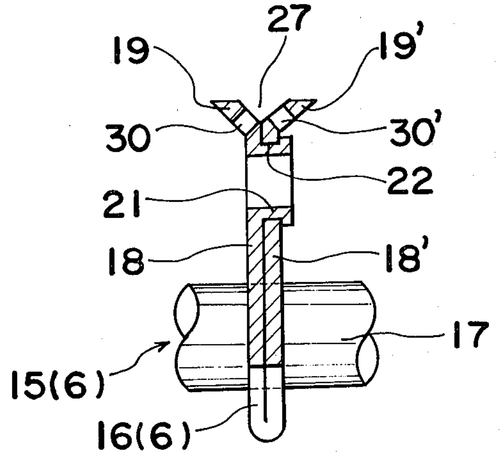
FIG. 17 is a view similar to FIG. 7, particularly showing a sixth modification thereof.

Meanwhile, in addition to a solution offered by the inner blade 15(5) for the above described unsanitary problem, a pair of elongated through-openings 30 and 30' are formed on the first blade tip portion 19 and the second blade tip portion 19', respectively in a circumferential direction thereof in an inner blade element 16(6) of an inner blade 15(6) of a sixth modification of the inner blade 15 as shown in FIG. 17 such that hair fragments, sebaceous matters, etc. entering into the V-shaped space 27 during use of the electric shaver are discharged through the elongated through-openings 30 and 30' out of the first blade tip portion 19 and the second blade tip portion 19' downwardly so as to prevent hair fragments, sebaceous matters, etc. from being accumulated in the V-shaped space 27. It is to be noted that it can be so arranged that only the elongated through-opening 30 is formed on the first blade tip portion 19 with the elongated through-opening 30' being not formed on the second blade tip portion 19', or vice versa.

Figure 18:
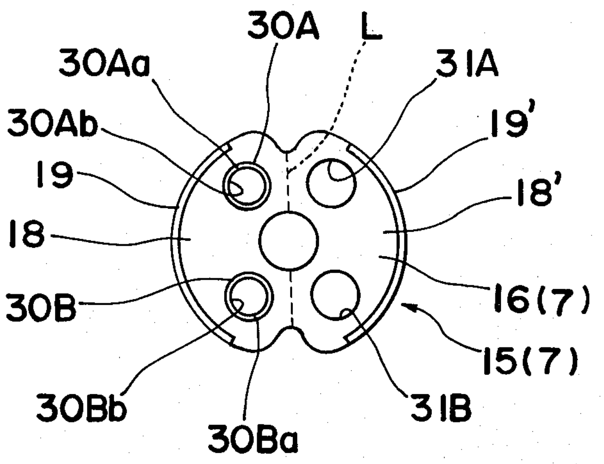
FIG. 18 is a view similar to FIG. 8, particularly showing a seventh modification thereof.
Figure 19:
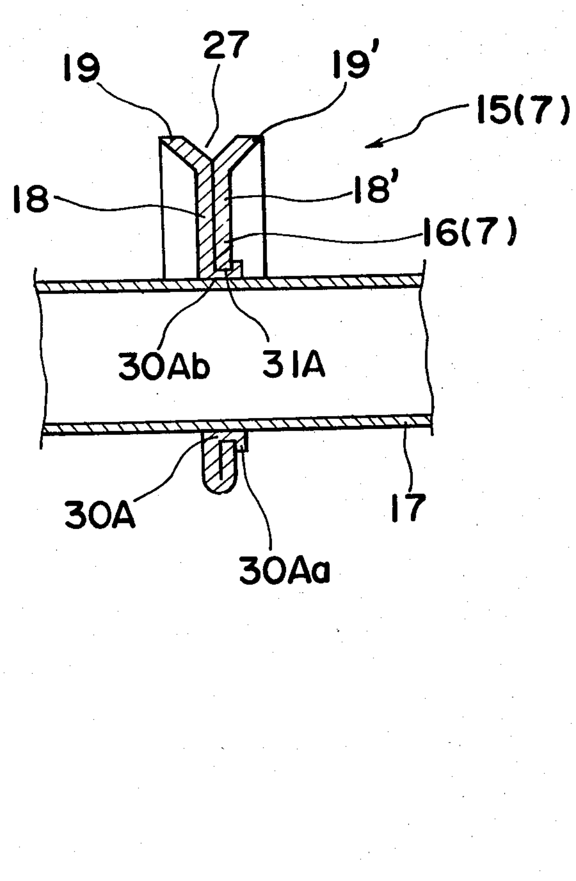
FIG. 19 is a view similar to FIG. 7, showing the inner blade element of FIG. 18.

Furthermore, referring now to FIGS. 18 and 19, there is shown an inner blade element 16(7) of an inner blade 15(7) of a seventh modification of the inner blade 15. Although the cylindrical projection 21 and the corresponding caulking hole 22 are provided separately from the coupling holes 20A and 20B into which the respective coupling members 17 are fitted in the case of the inner blade 15, a pair of cylindrical projections 30A and 30B and a pair of corresponding caulking holes 31A and 31B are, respectively, formed on the first inner blade element portion 18 and the second inner blade element portion 18' such that the coupling members 17 are fitted into an opening 30Ab of the cylindrical projection 30A and an opening 30Bb of the cylindrical projection 30B, respectively in the case of the inner blade 15(7). More specifically, when the inner blade element 16(7) are folded into the first inner blade element portion 18 and the second inner blade element portion 18', the cylindrical projections 30A and 30B are, respectively, fitted into the caulking holes 31A and 31B. Then, a projecting end 30Aa of the cylindrical projection 30A and a projecting end 30Ba of the cylindrical projection 30B are caulked on one face of the second inner blade element portion 10' remote from the first inner blade element portion 18, whereby the coupling members 17 can be, respectively, fitted into the opening 30Ab and 30Bb.

As is clear from the foregoing description, in accordance with the present invention, since the first blade element portion 18 and the second inner blade element portion 18' of the inner blade element 16 are formed integrally with each other to have the U-shaped cross section and the cylindrical projection 21 provided on the first inner blade element portion 18 is fitted into the caulking hole 22 provided on the second inner blade element portion 18' so as to be caulked on one face of the second inner blade element portion 18' remote from the first inner blade element portion 18, assembly of the inner blade 15 can be performed with much ease and the first inner blade element portion 18 and the second inner blade element portion 18' are securely prevented from being separated from each other. Especially, since caulking is performed at a position between the coupling holes 20A and 20B of the inner blade element 16, central portions of the first inner blade element portion 18 and the second inner blade element portion 18' between the coupling holes 20A and 20B, which serve most for cutting hairs and tend to be readily separated from each other are remarkably effectively and securely prevented from being separated from each other. Meanwhile, since the caulking hole 22 is provided seaprately from the coupling holes 20A and 20B and the cylindrical projection 21 fitted into the caulking hole 22 is formed into a cylindrical shape, the inner blade 15 as a whole is reduced in weight partly due to small thickness of the sheet for inner blade element 16 so as to function fairly smoothly.

In accordance with the present invention, since the inner blade element 16(4) has the pair of the slits 28*a* and 28*b* extending, respectively, from the folding opening 25 in opposite directions outwardly on the folding line L in addition to the folding opening 25 and the pair of the V-shaped recesses 26A and 26B, folding of the blank for the inner blade element 16(4) can be performed fairly easily with a small force.

Furthermore, in accordance with the present invention, the filler 29 made of quick-drying epoxy resion, etc. is filled in the V-shaped space 27 of the inner blade element 16(5) of the inner blade 15(5), hair fragments, sebaceous matters, etc. giving off an offensive smell are positively prevented from being accumulated in the V-shaped space 27, whereby the remarkably sanitary inner blade 15(5) has been obtained.

Moreover, in accordance with the present invention, since the pair of the elongated through-opening 30 and 30' are provided on the first blade tip portion 19 and the second blade tip portion 19', respectively in a circumferential direction thereof such that hair fragments, sebaceous matters, etc. entering into the V-shaped space 27 during use of the electric shaver are discharged through the elongated through-opening 30 and 30' out of the first blade tip portion 19 and the second blade tip portion 19' downwardly, whereby hair fragments, sebaceous matters, etc. are positively prevented from being accumulated in the V-shaped space 27.

Still furthermore, in accordance with the present invention, since the pair of the cylindrical projections 30A and 30B and the pair of the corresponding caulking holes 31A and 31B are, respectively, provided on the first inner blade element portion 18 and the second inner blade element portion 18' of the inner blade element 16(7) such that the coupling members are, respectively, fitted into the opening 30Ab of the cylindrical projection 30A and the opening 30Bb of the cylindrical projection 30B, it becomes unnecessary to provide the cylindrical projection 21 and the caulking hole 22 separately from the coupling holes 20A and 20B into which the respective coupling members 17 are fitted as in th the case of the inner blade element 16.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A inner blade (15) for use in a reciprocating type electric shaver, including at least two support members (17) and a plurality of inner blade elements (16) mounted, in parallel with each other and at a predetermined interval therebetween in reciprocating directions of said inner blade (15), on said at least two support members (17), the improvement comprising:

said inner blade element (16) having a pair of a first blade tip portion (19) and a second blade tip portion (19'), which is formed by folding, a blank (24) having a profile symmetrical with respect to a line (L), along said line (L) into a pair of a first inner blade element portion (18) and a second inner blade element portion (18') so as to have a U-shaped cross section along said line (L) at one end of said inner blade element (16) such that said first inner blade element portion (18) is brought into close contact with said second inner blade element portion (18');

said pair of said first blade tip portion (19) and said second blade tip portion (19') which are, respectively, provided at one end of said first inner blade element portion (18) remote from said one end of said inner blade element (16) and at one end of said second inner blade element portion (18') remote from said one end of said inner blade element (16) and are, respectively, formed by bending said one end of said first inner blade element portion (18) and said one end of said second inner blade element portion (18') outwardly in opposite directions remote from each other so as to constitute a rake angle (θ) at each of said first blade tip portion (19) and said second blade tip portion (19') such that said inner blade element (16) has a Y-shaped cross section at the other end thereof with a V-shaped space (27) enclosed by said first blade tip portion (19) and said second blade tip portion (19') being formed at said other end of said inner blade element (16), whereby said pair of said first blade tip portion (19) and said second blade tip portion (19') are brought into sliding contact with an inner surface of a fixed outer blade (14) of said reciprocating type electric shaver; and said pair of said first inner blade element portion (18) and said second inner blade element portion (18') which have, respectively, at least two first coupling holes (20*a*, 20*b*) and at least two second coupling holes (20*a*', 20*b*') provided at positions corresponding to those of the respective at least two first coupling holes (20*a*, 20*b*) so as to form at least two coupling holes (20A, 20B) on said inner blade element (16) such that said at least two support members (17) are inserted through the at least two coupling holes (20A, 20B) of each of the plurality of said inner blade elements (16), respectively.

2. An inner blade (15) as claimed in claim 1, wherein said inner blade element (16) has a pair of recesses (26*a*, 26*b*) extending, respectively, inwardly in opposite directions towards each other along said line (L).

3. An inner blade (15) as claimed in claim 1 or claim 2, wherein said inner blade element (16) has a folding opening (25) provided at a central portion thereof on said line (L) and a pair of slits (28*a*, 28*b*) extending, respectively, from the folding opening (25) in opposite directions outwardly in opposite directions remote from each other along said line (L).

4. An inner blade (15) as claimed in claim 1, wherein said inner blade element (16) is made of materials which have been subjected to rolling with said line (L) being directed at right angles to direction of the rolling.

5. An inner blade (15) as claimed in claim 1, wherein the V-shaped space (27) is filled with filler (29) so as to prevent hair fragment, sebaceous matters, etc. from being accumulated in the V-shaped space (27).

6. A inner blade (15) as claimed in claim 1, wherein said first blade tip portion (19) and and said second blade tip portion (19') have, respectively, a pair of elongated through-openings (30, 30') formed in a circumferential direction thereof such that hair fragments, sebaceous matters, etc. entering into the V-shaped space (27) during use of said reciprocating type electric shaver are discharged through the elongated through-openings (30, 30') out of said first blade tip portion (19) and said second blade tip portion (19').

7. An inner blade (15) as claimed in claim 1, claim 2, claim 4, claim 5, or claim 6, wherein said first inner blade element portion (18) is securely held in close contact with said second inner blade element portion (18') through caulking either one of said first inner blade element portion (18) and said second inner blade element portion (18') against the other one of said first inner blade element portion (18) and said second inner blade element portion (18').

8. An inner blade (15) as claimed in claim 7, wherein said inner blade element (16) has a cylindrical projection (21) formed at a position different from positions of the coupling holes (20A, 20B), on one of said first inner blade element portion (18) and said second inner blade element portion (18') and a caulking hole (22) formed at a position corresponding to that of said cylindrical projection (21), on the other one of said first inner blade element portion (18) and said second inner blade element portion (18') such that said cylindrical projection (21) is fitted into the caulking hole (22) with a projecting end (21*a*) of said cylindrical projection (21) projecting out of the caulking hole (22), said projecting end (21*a*) being caulked so as to extend outwardly in a radial direction thereof along one face of said other one of said first inner blade element portion (18) and said second inner blade element portion (18') remote from said one of said first inner blade element portion (18) and said second inner blade element portion (18').

9. An inner blade (15) as claimed in claim 7, wherein said inner blade element (16) has a pair of cylindrical projections (30A, 30B) formed, respectively, at positions of the coupling holes (20A, 20B), on one of said first inner blade element portion (18) and said second inner blade element portion (18') and a pair of caulking holes (31A, 31B) formed at positions corresponding to those of said pair of said cylindrical projections (30A, 30B), on the other one of said first inner blade element portion (18) and said second inner blade element portion (18') such that said cylindrical projections (30A, 30B) are, respectively, fitted into the caulking holes (31A, 31B) with projecting ends (30Aa, 30Ba) of said cylindrical projections (30A, 30B) projecting out of the caulking holes (31A, 31B), respectively, said projecting ends (30A, 30Ba) being caulked so as to extend outwardly in a radial direction thereof along one face of said other one of said first inner blade element portion (18) and said second inner blade element portion (18') remote from said one of said first inner blade element portion (18) and said second inner blade element portion (18'), whereby said support members (17) can be, respectively, fitted into openings (30Ab, 30Bb) of said cylindrical projections (30A, 30B).

* * * * *